(12) United States Patent
Hymel et al.

(10) Patent No.: US 9,299,065 B2
(45) Date of Patent: Mar. 29, 2016

(54) INTELLIGENT DOWNLOADING OF MESSAGE ATTACHMENTS TO MOBILE DEVICES

(75) Inventors: James Allen Hymel, Kitchener (CA); William Donald Santo, Waterloo (CA)

(73) Assignee: BlackBerry Limited, Waterloo (CA)

( * ) Notice: Subject to any disclaimer, the term of this patent is extended or adjusted under 35 U.S.C. 154(b) by 558 days.

(21) Appl. No.: 13/399,021

(22) Filed: Feb. 17, 2012

(65) Prior Publication Data

US 2013/0218982 A1    Aug. 22, 2013

(51) Int. Cl.
G06F 15/16    (2006.01)
G06Q 10/10    (2012.01)
H04L 12/58    (2006.01)

(52) U.S. Cl.
CPC ............ G06Q 10/1093 (2013.01); H04L 51/08 (2013.01)

(58) Field of Classification Search
CPC .. G06Q 10/109; G06Q 10/1093; G06F 9/542; H04M 3/42348; H04M 2242/30; H04M 2250/10; H04L 51/08
USPC .......................................................... 709/206
See application file for complete search history.

(56) References Cited

U.S. PATENT DOCUMENTS

| | | | |
|---|---|---|---|
| 6,088,026 A | | 7/2000 | Williams |
| 6,446,004 B1* | | 9/2002 | Cao et al. ...................... 701/482 |
| 6,839,744 B1* | | 1/2005 | Kloba et al. ................. 709/219 |
| 2006/0133340 A1 | | 6/2006 | Rybak et al. |
| 2008/0159503 A1* | | 7/2008 | Helbling ............... H04M 3/565 379/142.17 |
| 2009/0022297 A1* | | 1/2009 | Jackson ............... G06Q 10/109 379/210.01 |
| 2009/0100256 A1* | | 4/2009 | Fuccello ....................... 713/100 |
| 2010/0198646 A1* | | 8/2010 | Mikan et al. ...................... 705/9 |
| 2011/0106892 A1* | | 5/2011 | Nelson et al. ................. 709/206 |
| 2011/0294464 A1* | | 12/2011 | Fiatal ............................ 455/406 |
| 2012/0015637 A1* | | 1/2012 | Mann ......................... 455/414.1 |
| 2013/0024233 A1* | | 1/2013 | Aaron et al. .................. 705/7.19 |
| 2013/0064142 A1* | | 3/2013 | Bhow .................. H04L 12/1818 370/260 |
| 2013/0101107 A1* | | 4/2013 | DeJana et al. ........... 379/204.01 |
| 2013/0102329 A1* | | 4/2013 | Forstall et al. ............. 455/456.3 |
| 2013/0110948 A1* | | 5/2013 | Davis et al. ................... 709/206 |

FOREIGN PATENT DOCUMENTS

| | | |
|---|---|---|
| EP | 1898346 A1 | 3/2008 |
| JP | 2004151063 | 5/2004 |

(Continued)

OTHER PUBLICATIONS

European Search Report dated Oct. 8, 2012 from corresponding EP application 12155923.1.

(Continued)

Primary Examiner — Brian J Gillis
Assistant Examiner — Steve Lin
(74) Attorney, Agent, or Firm — Moffat & Co.

(57) ABSTRACT

A method of downloading data to a mobile device, the method comprising receiving a message at the mobile device, the message including an indication that there is an attachment to the message that is available for downloading to the mobile device, determining if the attachment relates to a calendar event, determining if a user of the mobile device requires the attachment for participating in the calendar event, and automatically downloading the attachment to the mobile device in response to the mobile device determining that the attachment is required for participation in the calendar event.

17 Claims, 9 Drawing Sheets

(56) References Cited

FOREIGN PATENT DOCUMENTS

| JP | 2009162697 | | 7/2009 |
|----|------------|----|--------|
| JP | 2009301267 | | 12/2009 |
| WO | 0158180 | A2 | 8/2001 |
| WO | 0165336 | A2 | 9/2001 |

OTHER PUBLICATIONS

Canadian Intellectual Property Office, Office Action on Application No. 2,806,733, Issued on Jul. 6, 2015.
Summons to Attend Oral Proceedings dated Dec. 23, 2014 issued on corresponding European Patent Application No. 12155923.1.

* cited by examiner

INTELLIGENT DOWNLOADING OF MESSAGE ATTACHMENTS TO MOBILE DEVICES

CROSS-REFERENCE TO RELATED APPLICATIONS

This is the first application filed for the present technology.

TECHNICAL FIELD

The present technology relates generally to mobile devices and, in particular, to message attachment management techniques for mobile devices.

BACKGROUND

Mobile devices may accumulate large quantities of e-mail data, which can occupy an undesirably significant portion of the device's memory. This is due primarily to messages such as e-mails that have large attachments. Furthermore, downloading these messages with their attachments can be a burden on the wireless link. It is therefore desirable to provide a technique for intelligently downloading message attachments on mobile devices.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides an intelligent way to download message attachments to a mobile device whose user is scheduled to participate in a calendared event such as, for example, a teleconference. The mobile device determines if the user is attending, or will be attending, the calendared event and then automatically downloads any message attachments that relate to the event. After the event is over, the device may optionally delete the attachment, again automatically, as a means of minimizing the data stored in the memory of the device.

Accordingly, one aspect of the present technology is a method of downloading data to a mobile device. The method entails receiving a message at the mobile device, the message including an indication that there is an attachment to the message that is available for downloading to the mobile device. The method also entails determining if the attachment relates to a calendar event, determining if a user of the mobile device requires the attachment for participating in the calendar event, and automatically downloading the attachment to the mobile device in response to the mobile device determining that the attachment is required for participation in the calendar event.

Another aspect of the present technology is a computer-readable medium comprising instructions in code which when loaded into a memory and executed by a processor of a mobile device cause the mobile device to receive a message at the mobile device, the message including an indication that there is an attachment to the message that is available for downloading to the mobile device, determine if the attachment relates to a calendar event, determine if a user of the mobile device requires the attachment for participating in the calendar event, and automatically download the attachment to the mobile device in response to the mobile device determining that the attachment is required for participation in the calendar event.

Another aspect of the present technology is a mobile device comprising a radiofrequency transceiver for receiving a message at the mobile device, a display for displaying the message including an indication that there is an attachment to the message that is available for downloading to the mobile device, and a memory operatively coupled to a processor for determining if the attachment relates to a calendar event, determining if a user of the mobile device requires the attachment for participating in the calendar event, and for instructing the radiofrequency transceiver to automatically download the attachment to the mobile device in response to the mobile device determining that the attachment is required for participation in the calendar event.

The details and particulars of these aspects of the technology will now be described below, by way of example, with reference to the drawings.

By way of overview, the present technology enables a mobile device to automatically download message attachments that relate to a calendar event like a meeting, appointment, conference call, or other such event. The mobile device downloads the attachment automatically, i.e. without user input, by determining that the user of the device is (or will be) participating in the calendar event. Subsequent to the meeting, conference call or other calendar event, the device may delete or purge the attachment(s) downloaded for the event so as to minimize the amount of data stored in the memory of the device. This innovative way of managing attachments not only minimizes memory usage, but also automates the process of obtaining attachments that are relevant for the user participating in a meeting or conference call.

Figure 1:
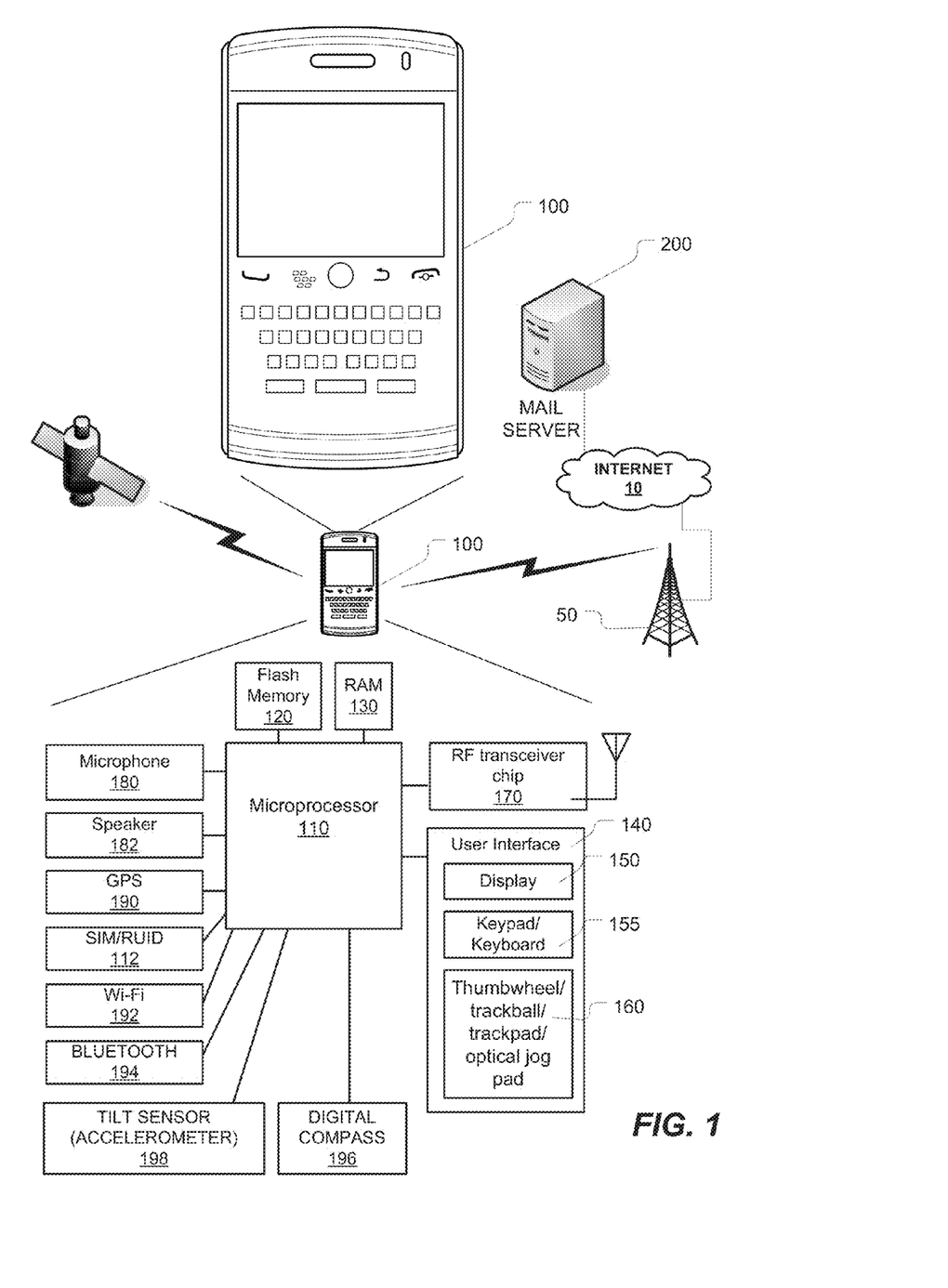
FIG. 1 is a depiction of a mobile device on which the present technology may be implemented, the depiction including a schematic depiction of some components of the mobile device.

FIG. 1 is a depiction of a mobile device, which is generally designated by reference numeral 100. The mobile device 100 includes a processor (or microprocessor) 110 and memory 120, 130 for executing one or more applications such as an e-mail application and/or a calendar application. For the purposes of this specification, the e-mail application and calendar application may be a single integrated application that performs both messaging and calendaring functions or two separate applications that interact to enable invitation messages (new meeting requests) to be generated as calendar entries in the calendar.

As depicted by way of example in FIG. 1, the memory may include flash memory 120 and/or random access memory (RAM) 130 for storing an e-mail application that includes mailboxes for received mail, sent mail, etc. The memory may also store calendar event data for a calendar application (electronic diary or appointment book). Other types or forms of memory may be substituted or used.

As depicted by way of example in FIG. 1, the mobile device 100 includes a user interface 140 for interacting with the mobile device and any applications running on the device, such as, for example, the e-mail application and the calendar application. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packetized data transfer such as GSM, CDMA, GPRS, EDGE, UMTS, LTE, etc. As such, e-mail messages (including new meeting requests or other such invitations) may be sent wirelessly over the air to the mobile device.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 optionally includes a speech-recognition subsystem that for transforming voice input received by a microphone 180 in the form of sound waves into an electrical signal. The electrical signal is then processed by a speech-recognition module (digital signal processor) to determine keywords or phrases from the voice input. Optionally, the mobile device 100 may include a speaker 182 and/or an earphone jack.

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

A handheld wireless communications device, with mobile e-mail capability, such as the one depicted in FIG. 1, is but one example of a mobile device 100 on which the present technology may be implemented. Other mobile devices 100 may include cell phones, laptops, palmtops, notebooks, tablets, or any other portable or handheld communication devices.

To implement this novel technology, the memory 120, 130 of the mobile device 100 depicted by way of example in FIG. 1 stores an e-mail application for sending or receiving e-mail messages or other textual or datagram-based messages. For the purposes of this specification, a message or e-mail message is meant to include meeting requests, invitations to an event, appointment request or any other such message that is sent in the form of an e-mail or using e-mail protocols and which then interacts with the calendar application to create a calendar entry either automatically or in response to the user accepting the new meeting request or invitation. The processor 110, which is operatively coupled to the memory 120, 130, executes the mobile e-mail application to provide various message-composition functions, mailbox viewing functions, etc. This mobile e-mail application may operate as a client to a mail server. Likewise, the memory 120, 130 stores a calendar application that may operate in a client-server relationship. As such, it should be understood that interactions between the e-mail application and calendar application may occur on the mobile device and/or on the respective server(s).

Operation of this novel technology will now be described with reference to the examples depicted in FIGS. 2-5. These examples illustrate how attachments to a message such as a new meeting request may be downloaded intelligently and automatically by the mobile device.

Figure 2:
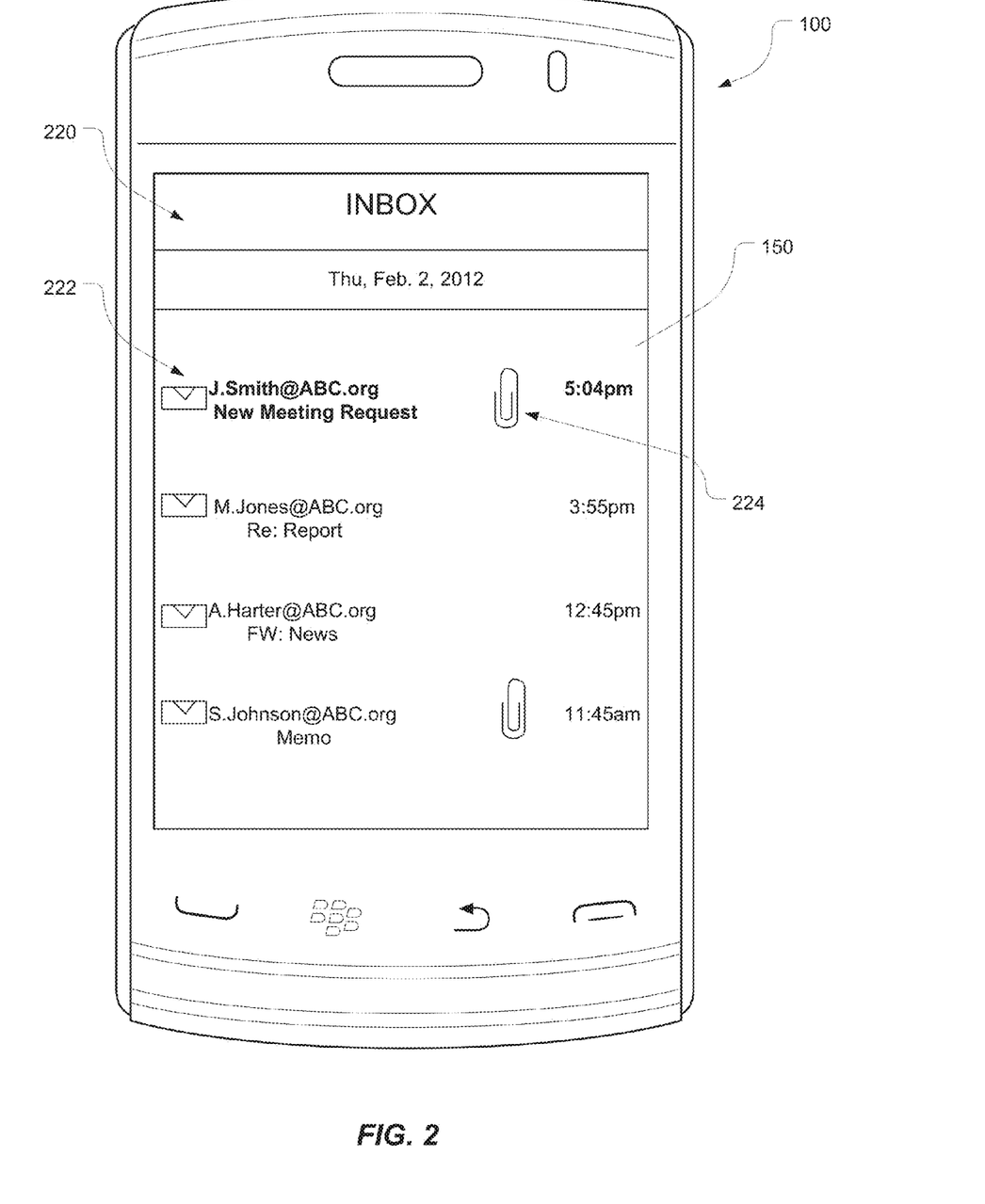
FIG. 2 is a depiction of an example in which a mobile device displays an inbox containing a new meeting request for which an attachment is available for download to the mobile device.

As shown by way of example in FIG. 2, the e-mail application displays an inbox with a list of received e-mail messages. In a variant, the e-mail application may instead display an integrated mailbox that contains both sent and received messages. Each message may be accompanied by an indication that there is one or more attachments for the message (i.e. for the invitation message or new meeting request) that is available for download by the mobile device. In the example of FIG. 2, the first message in the list is a new meeting request 222. This message includes, by way of example, an indication 224 that there is an attachment that the device may download. The indication 224 may be in the form of a paperclip icon, as illustrated, or any other icon, symbol or word. In the conventional manner, a user of the mobile device may manually request download of the attachment. In such a case, the device, in response to manual user input such as touching or clicking on the attachment, sends a request to a mail server to download the attachment. In accordance with various implementations of this new technology, the mobile device 100 may instead automatically download the attachment that relates to the calendar event without requiring the user to manually request download of the attachment. This is referred to herein as automatic downloading of the message attachment. This automatic downloading automates the process of obtaining attachments in a timely manner to ensure that the user has the necessary documents on his or her device at the meeting or event.

Figure 3:
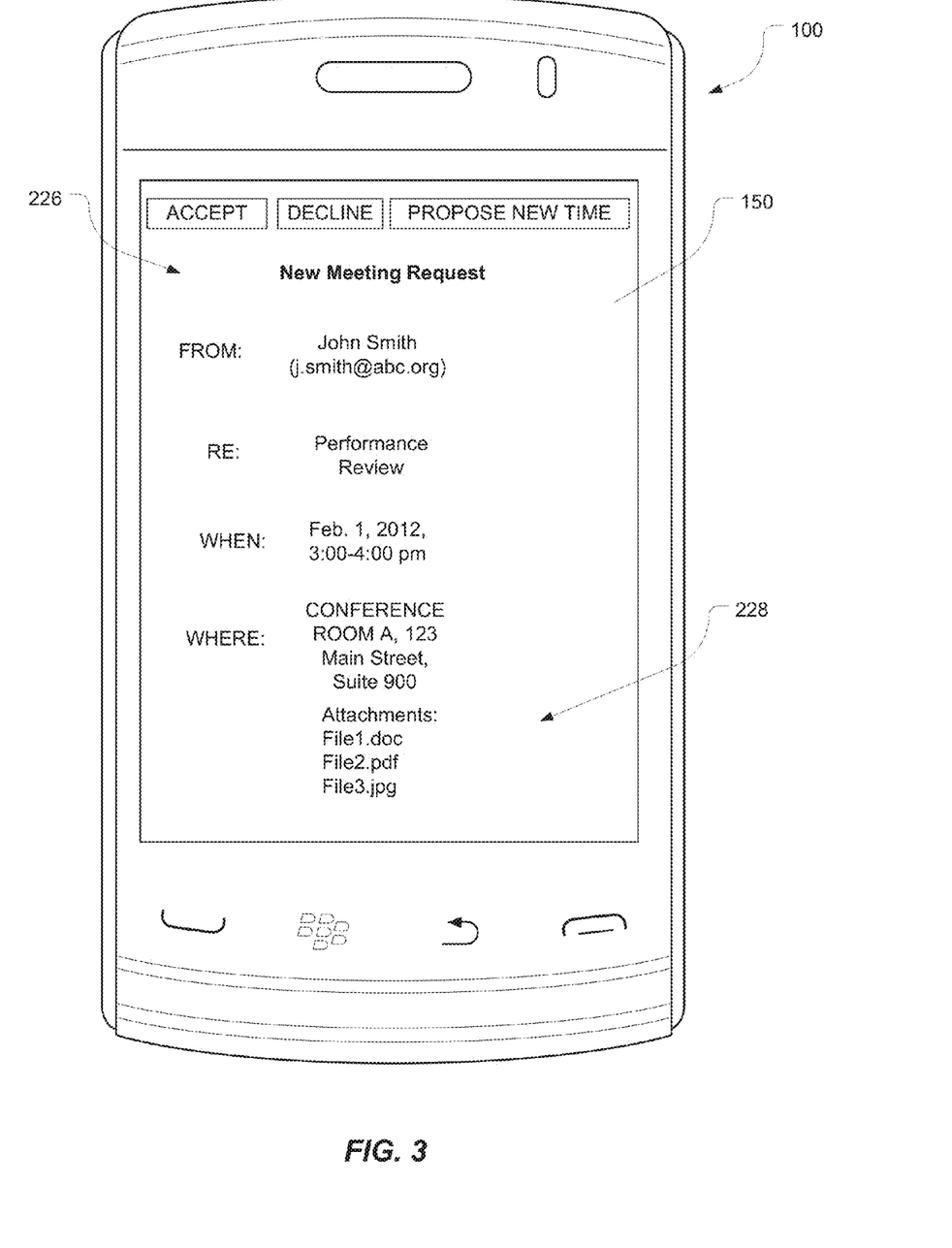
FIG. 3 depicts an example of the mobile device after the new meeting request has been opened, showing a list of attachments that may be downloaded to the mobile device.

As shown by way of example in FIG. 3, once the user of the mobile device has opened the new meeting request, the new meeting request details and particulars are displayed. The details of the new meeting request 226 may include the sender/organizer, the parties invited, the subject or name of the event, the start time, duration, location, contact information, a map or a link to a map, and a list of any attachments. The user may then accept or decline the new meeting request or he or she may propose a new time for the meeting. The device may optionally display information as to whether the time slot proposed in the new meeting request conflicts or is adjacent with another appointment or event already entered in the calendar. If the user accepts the new meeting request, the e-mail application and calendar application interact to cause a new calendar entry to be created with information supplied in the new meeting request.

FIG. 3 also shows by way of example how a list of attachments 228 may be displayed in the new meeting request. The list of attachments 228 may include one or more of file names, file sizes, file types, authors, creation dates, etc. The user may wish to view the attachments right away in which case he or she manually downloads one or more of the attachments, or may request a preview of one of more of the attachments. However, if the user does not download the attachments manually, the device will automatically download the attachments based upon a determination as to whether the user is attending, or will be attending, the meeting in question.

Figure 4:
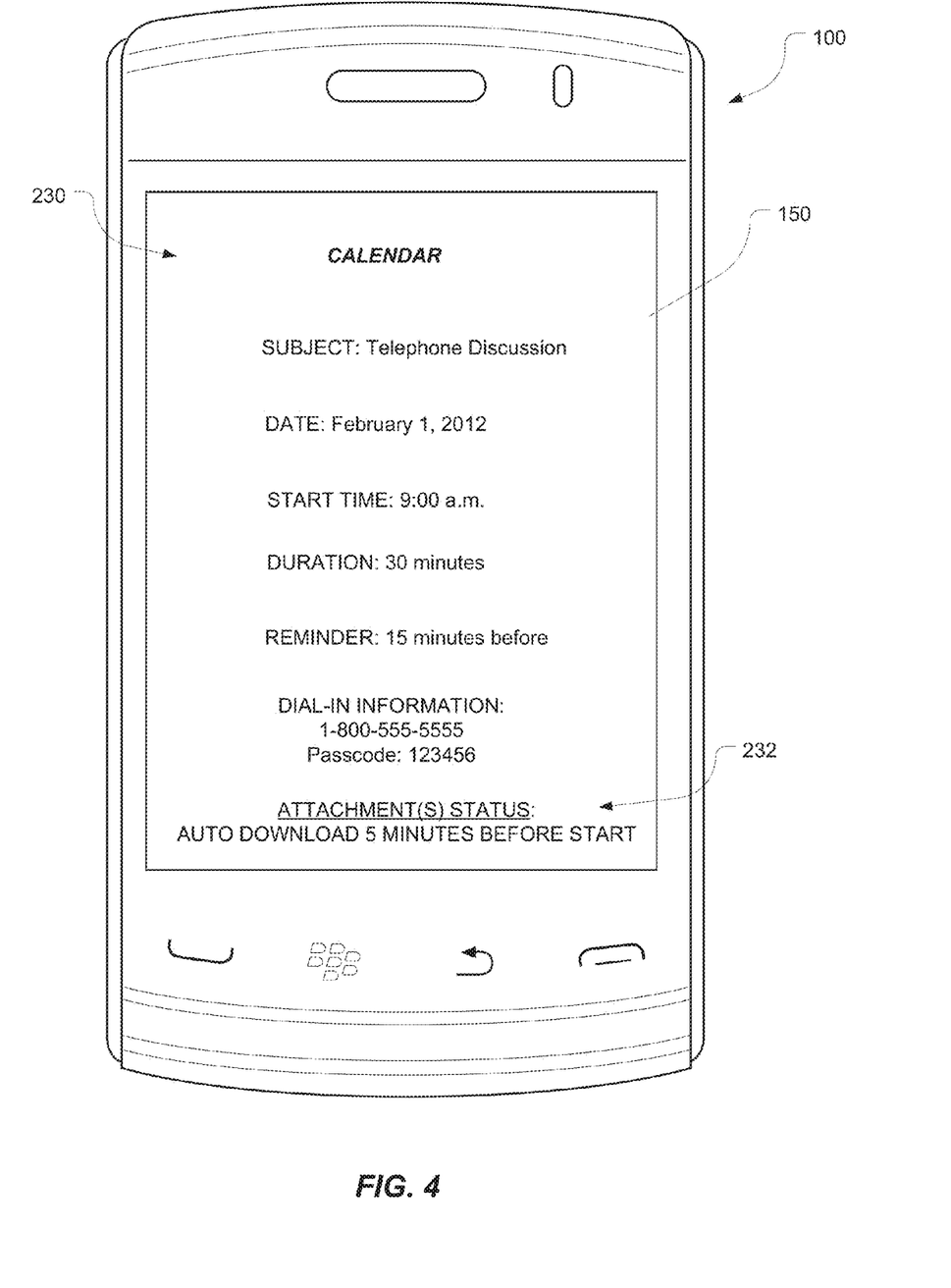
FIG. 4 depicts an example of the mobile device displaying a calendar entry with an attachment status indicating that attachments will be automatically downloaded before the start of the meeting or event.

FIG. 4 depicts a calendar entry that presents information about the event (appointment, meeting, conference call, etc.). For example, the calendar entry may display the subject, date, start time, duration, and reminder time may be displayed. Names of participants, invitees, etc. who are to be involved may also be displayed. In addition, any conference call information (dial-in information including any passcodes) may be presented. The calendar entry may also include an attachment status 232 indicating that the device is programmed to automatically download the attachments. Optionally, the attachment status may indicate when before the start of the meeting the attachments will be downloaded, e.g. attachments will be downloaded 5 minutes before the meeting.

Figure 5:
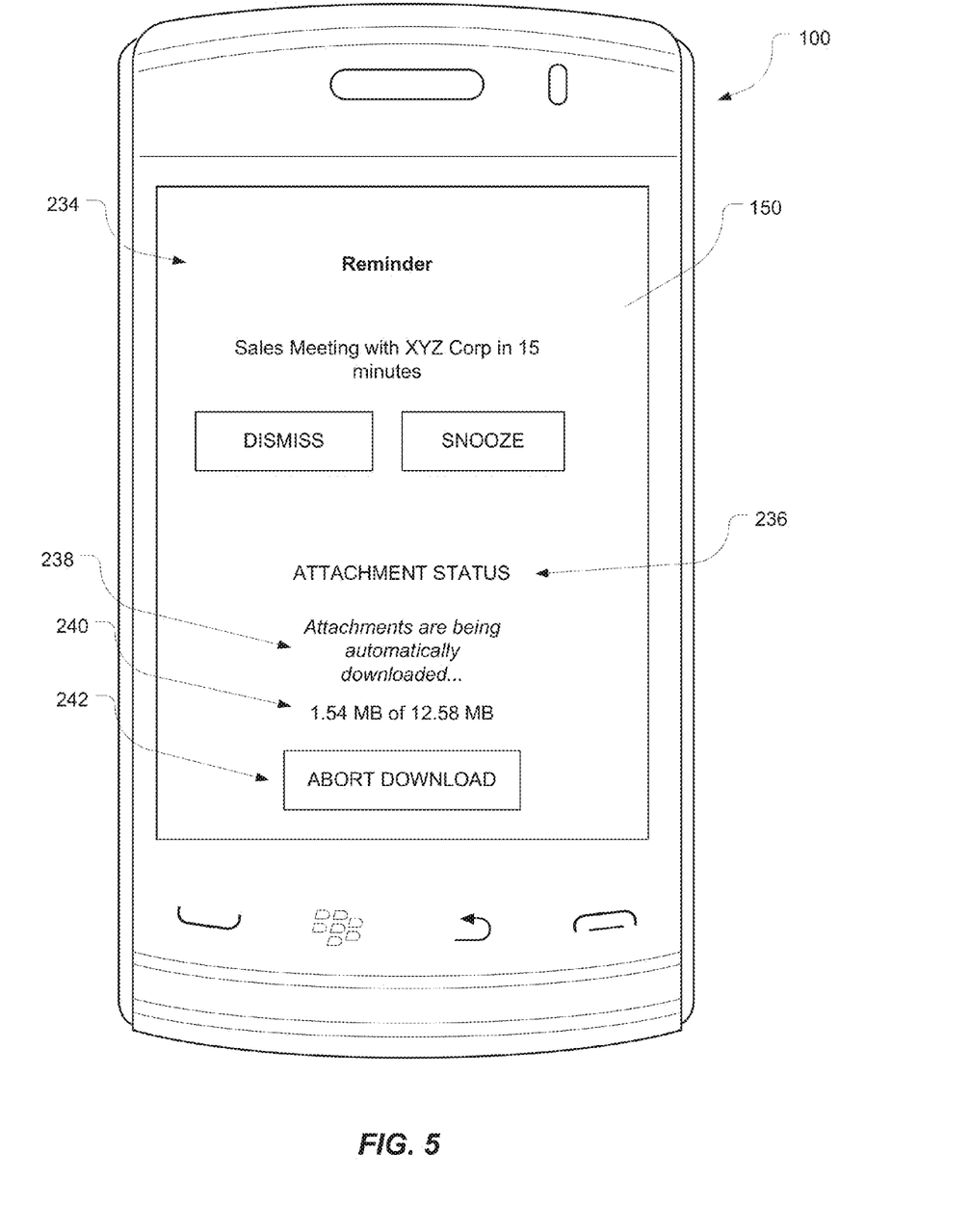
FIG. 5 is a depiction of an example of the mobile device displaying a reminder that also presents the attachment status.

FIG. 5 shows a pop-up reminder 234 that the calendar application presents a predetermined time before the start of the meeting. For example, in FIG. 5, the reminder is displayed 15 minutes before the start of the meeting. This reminder may also includes an attachment status 236. A notification 238 that the attachments are being automatically downloaded may be provided. This figure is solely to illustrate the concept and does not imply that the downloading begins or has begun when the reminder is displayed. Downloading may be delayed to only a few minutes before the meeting even if the reminder is displayed much earlier. Optionally, the attachment file size progress (or a progress bar) 240 may be displayed. Optionally, a user interface element 242 ("Abort Download") may be provided to manually abort or cancel the automatic download of the attachments.

FIGS. 2-5 thus illustrate how a calendar entry is created from acceptance of a new meeting request or other such message. The calendar entry is thus linked to the attachments that accompanied the message (meeting request). The attachments are thus linked through the originally received message in the inbox or through the calendar entry itself or both. Once the calendar entry has been created with a linkage to the (yet to be downloaded) attachments, the device creates one or more download-triggering conditions and then begins to monitor various factors like current location, time, dialled numbers, etc. to determine if one or more of the download-triggering conditions are met.

Figure 6:
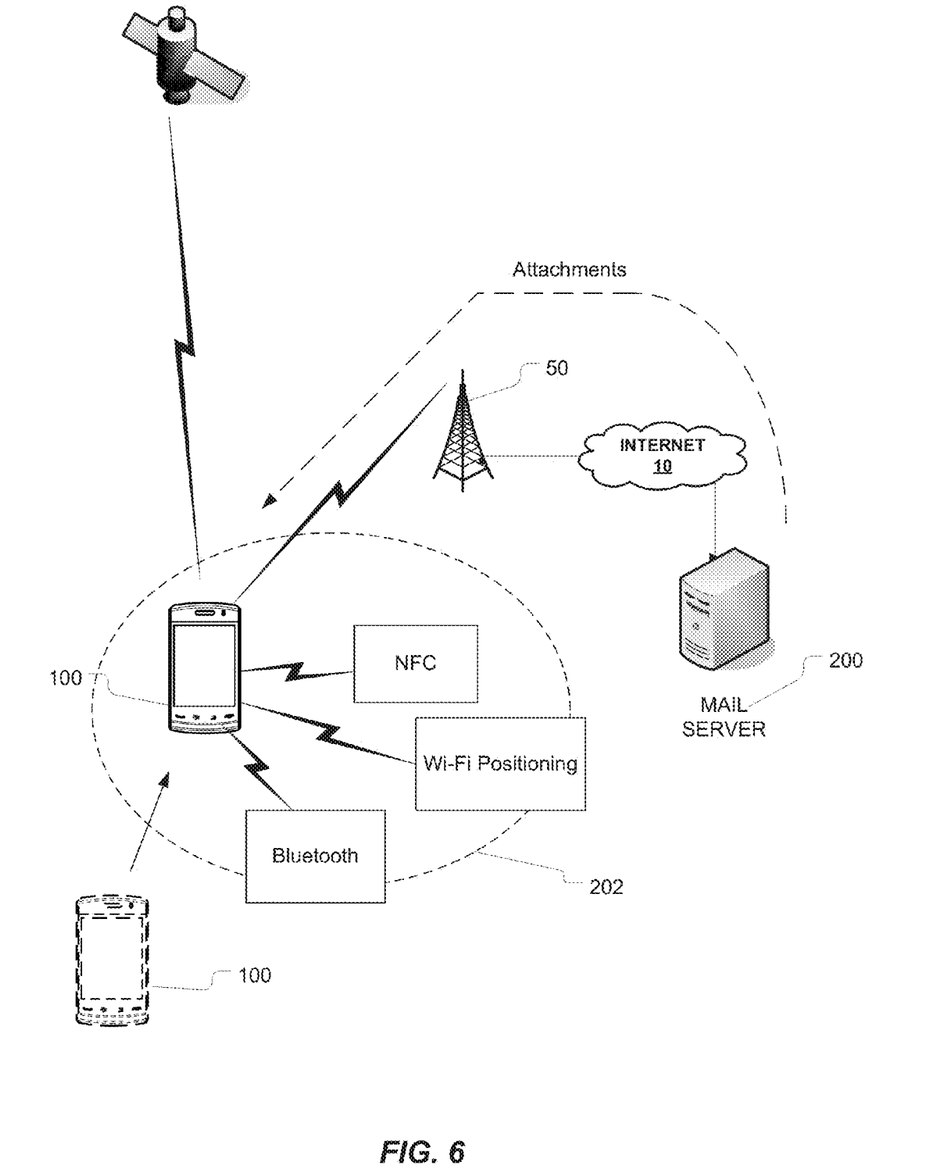
FIG. 6 depicts a system for downloading attachments in accordance with one implementation of the technology.

In one implementation, as depicted in FIG. 6, the mobile device 100 determines whether to automatically download an attachment by determining whether a current position of the mobile device matches a location of the calendar event at a time corresponding to the event. This leads the device to infer that the user of the device is physically attending the event. In this implementation the mobile device includes a position-determining subsystem for determining the current location of the mobile device. This position-determining subsystem may be a GNSS (global satellite navigation system) receiver such as, for example, a GPS (Global Positioning System) chipset 190 as shown by way of example in FIG. 1.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

References herein to "GPS" are meant to include Assisted GPS and Aided GPS.

Another sort of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

Other position-determining subsystems such as a WPS (Wi-Fi Positioning System) may also be used to provide more granular location data, as shown by way of example in FIG. 6. In some embodiments, it may be sufficient to determine in what country the device is operating. In other embodiments, greater precision may be necessary. These other location-determining subsystem may involve, for example, techniques based on the identity of the closest base station tower or techniques involving obtaining information stored in a home location register (HLR) or visitor location register (VLR).

As further illustrated in FIG. 6, other position-determining subsystems may include a near-field communication (NFC) reader that detects the presence of any other NFC-enabled device whose location is known, such as an NFC device installed in a conference room or embedded in another computing device.

As shown in FIG. 6, the current location of the mobile device 100 may thus be determined in any number of different ways, using GPS, WPS, Bluetooth®, NFC, or any other short-range wireless transceiver that is configured to determine if the mobile device is located at the calendar event.

Regardless of the means used to determine current location, the processor 110 of the mobile device 100 may be configured to determine if the current location of the mobile device 100 is within a predetermined distance of the location of the calendar event. This distance tolerance (e.g. +/− a distance of a certain number of meters) may be used to trigger the automatic downloading of the message attachment. In a variant, the device will only download the attachment if both the location matches (within the distance tolerance) and the time matches (again within a certain predetermined time tolerance). Any number of download-triggering conditions may thus be defined to trigger downloading of the attachment. These may include, as noted above, the current location of the mobile device (i.e. its proximity to the event location) and/or the current time. Other indicators that the user is participating in the event may include detecting that the user has dialled a teleconference dial-in number, as will be discussed in greater detail below.

Once automatic downloading is triggered by the triggering condition, the mobile device 100 downloads the attachment by transmitted a request to a mail server for one or more attachments (which may be any sort of text, image, video, or sound file, or any other file that may be attached to an e-mail message, invitation, meeting request, etc.). The mail server responds with data packets constituting the one or more attachments that have been requested. These data packets are transmitted over the air to the mobile device, are received by the RF transceiver, and reconstituted by the device into the attachments.

In one implementation, the display presents a graphical notification, e.g. text, symbol, icon, etc. to indicate that the attachment is being automatically downloaded.

In one implementation, the processor 110 of the mobile device 100 is configured to delete the attachment from the memory 120, 130 of the mobile device in response to determining that a scheduled time of the calendar event has elapsed or that the mobile device has strayed beyond the predetermined distance from the location of the calendar event. In one specific implementation, the mobile device presents, e.g. displays via the user interface 140, a user prompt to request user confirmation that the attachment is to be deleted. The device then only deletes the attachment in response to the receipt of user input via the user interface 140 that signifies that the user has confirmed that the attachment is to be deleted. The prompt may be visual or audible. The user input may be manual input or voice input. In another implementation, the device may display an indication that the attachment has been deleted.

As mentioned above, another way for the mobile device to intelligently determine or predict when attachments are required is to monitor the calendar events for indications that the event is a conference call. This may involve parsing the calendar entry for keywords like "conference call", "conference bridge" or "dial-in" or even just the presence of a phone number. If the device recognizes that the event is a conference call, then attachments may be automatically downloaded to the mobile device for consultation immediately prior to, or during, the conference call. One exemplary way of determining if the user is attending the conference call is by detecting a number dialled by the mobile device or, alternatively, by a networked landline telephone linked to the mobile device, e.g. using mobile voice system (MVS) or any equivalent technology. For example, the mobile device may have a mobile voice system (MVS) client stored in the memory of the mobile device and executed by the processor of the mobile device to detect a number dialled by the landline telephone, e.g. an IP phone networked to a server that is in communication with the mobile device.

Accordingly, the device determines if the calendar event is a conference call and determines if a user of the mobile device is participating in the conference call by correlating a number dialled by the mobile device or by a landline telephone associated with the mobile device with a number stored in association with the calendar event.

Downloading of attachments may also be based on the relevancy of the content of an attachment. In one implementation, the mail server parses the content of the attachments to determine which attachments of an e-mail message (or of an invitation message or meeting request message) stored at the mail server are actually relevant to the calendar event. In this implementation, the mobile device parses the calendar entry for the calendar event to identify keywords. This may entail parsing any attachments already received for the calendar event. The mobile device then transmits these keywords to the mail server with the request to automatically download the attachments. The mail server then parses the attachments to determine which of the attachments are relevant to the event. The mail server will then only send the attachments that are relevant. The device may be user-reconfigurable to enable the device to request that this parsing/filtering be done or to always send all of the attachments.

In another implementation, the mobile device may send with the request to download an attachment a list of attachments already stored on the device (e.g. already manually downloaded) to enable the mail server to avoid sending any duplicate attachments.

In another implementation, the mobile device may send the request to automatically download attachments that are attached to all related e-mail messages. Related e-mail messages may include groupings of messages bearing a common subject line or grouped by any other means. In a variant, any e-mail messages that are related to the calendar event or to the invitation message or meeting request may be identified for downloading their attachments. For example, after the meeting has been accepted, a subsequent e-mail may reference the calendar event. The device may parse the subject line or content of the message to look for indications that the message relates to a calendared meeting. Words like, e.g., "Documents for our meeting" may enable the device to identify the subsequent e-mail as containing an attachment that should be downloaded for the meeting.

In another implementation, the device may receive an e-mail message that contains attachments and which refers to a telephone discussion without the message being a meeting request or invitation that generates the calendar entry. In that case, there is no calendar event created. However, in this particular implementation, the device may recognize that the e-mail message indicates that a discussion or phone call will occur. For example, the e-mail (which in this example is not in the form of a new meeting request) may read: "Call me at 10 this morning to discuss these documents." The device will recognize that the user has a call at 10 a.m. The attachments to the e-mail are then downloaded automatically by the device at 10 (or a few minutes before 10).

The present technology furthermore enables new methods of downloading attachments to a mobile device. In general, as depicted by way of example in FIG. 7, a method of downloading data to a mobile device entails receiving (300) a message at the mobile device, the message including an indication that there is an attachment to the message that is available for downloading to the mobile device, determining (310) if the attachment relates to a calendar event, determining (320) if a user of the mobile device requires the attachment for participating in the calendar event, and automatically downloading (330) the attachment to the mobile device in response to the mobile device determining that the attachment is required for participation in the calendar event.

In one implementation of the method, the device determines if the mobile device is proximal to a location of the calendar event whereby the attachment is automatically downloaded if the mobile device is proximal to the location of the calendar event at a time corresponding to the calendar event. Determining if the mobile device is proximal to the location of the calendar event may comprise determining a current position of the mobile device using a position-determining subsystem on the mobile device.

Figure 7:
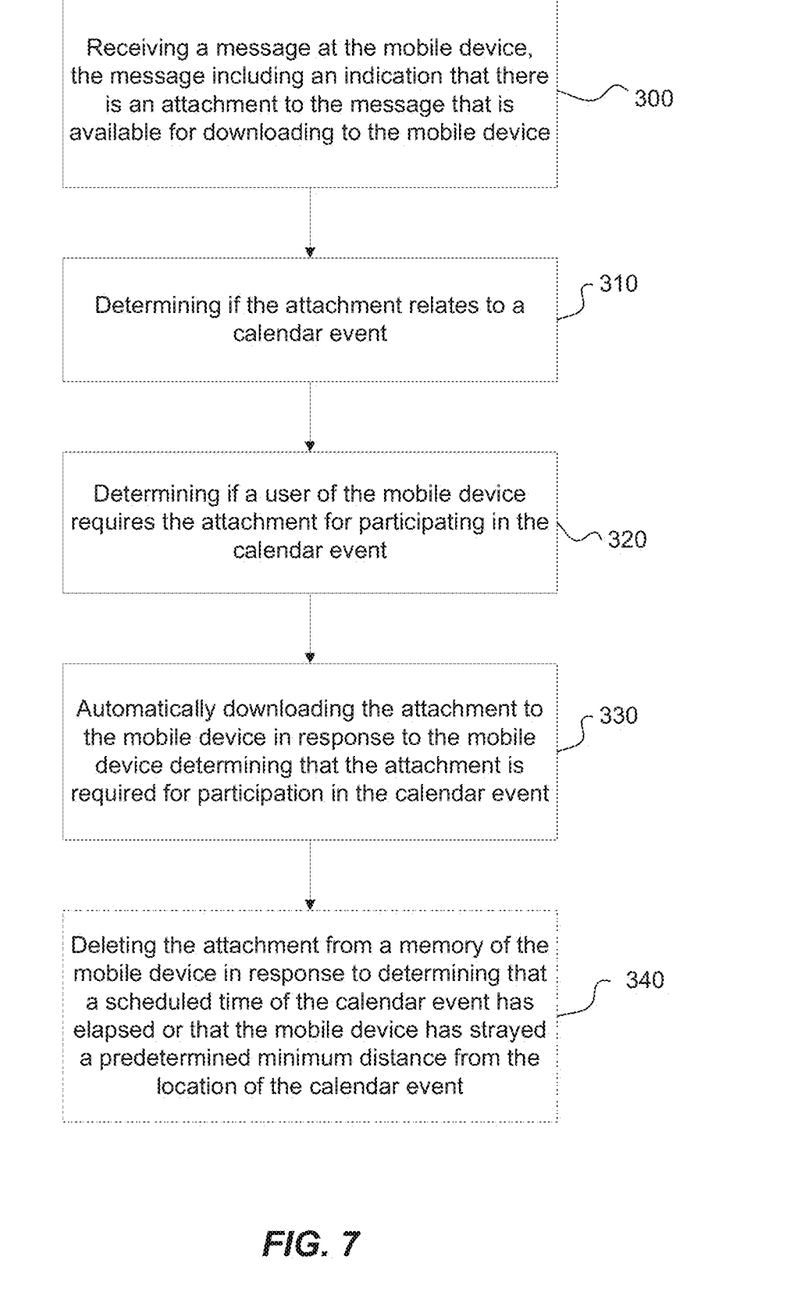
FIG. 7 is a flowchart depicting a method of downloading data to a mobile device in accordance with one implementation of the present technology.
Figure 8:
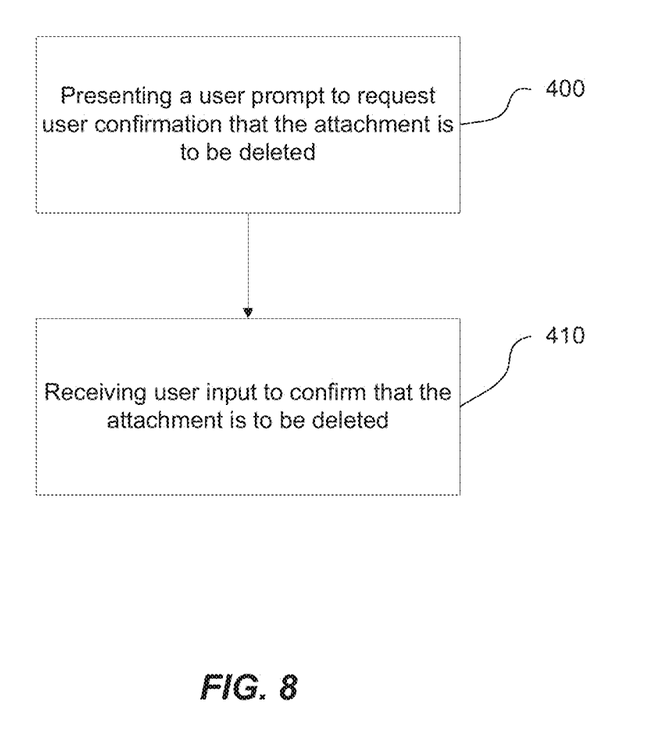
FIG. 8 is a flowchart depicting a further method of deleting downloaded attachments in accordance with one implementation of the present technology.

In one implementation of the method, as shown in dashed lines in FIG. 7, the attachment is deleted or purged from a memory of the mobile device in response to determining that a scheduled time of the calendar event has elapsed or that the mobile device has strayed a predetermined minimum distance from the location of the calendar event (step 340). As shown in FIG. 8, deleting may involve presenting (400) a user prompt to request user confirmation that the attachment is to be deleted and receiving (410) user input to confirm that the attachment is to be deleted.

Determining if the user of the mobile device requires the attachment may comprise determining if the calendar event is a conference call and determining if a user of the mobile device is participating in the conference call by correlating a number dialled by the mobile device or by a landline telephone associated with the mobile device with a number stored in association with the calendar event.

Figure 9:
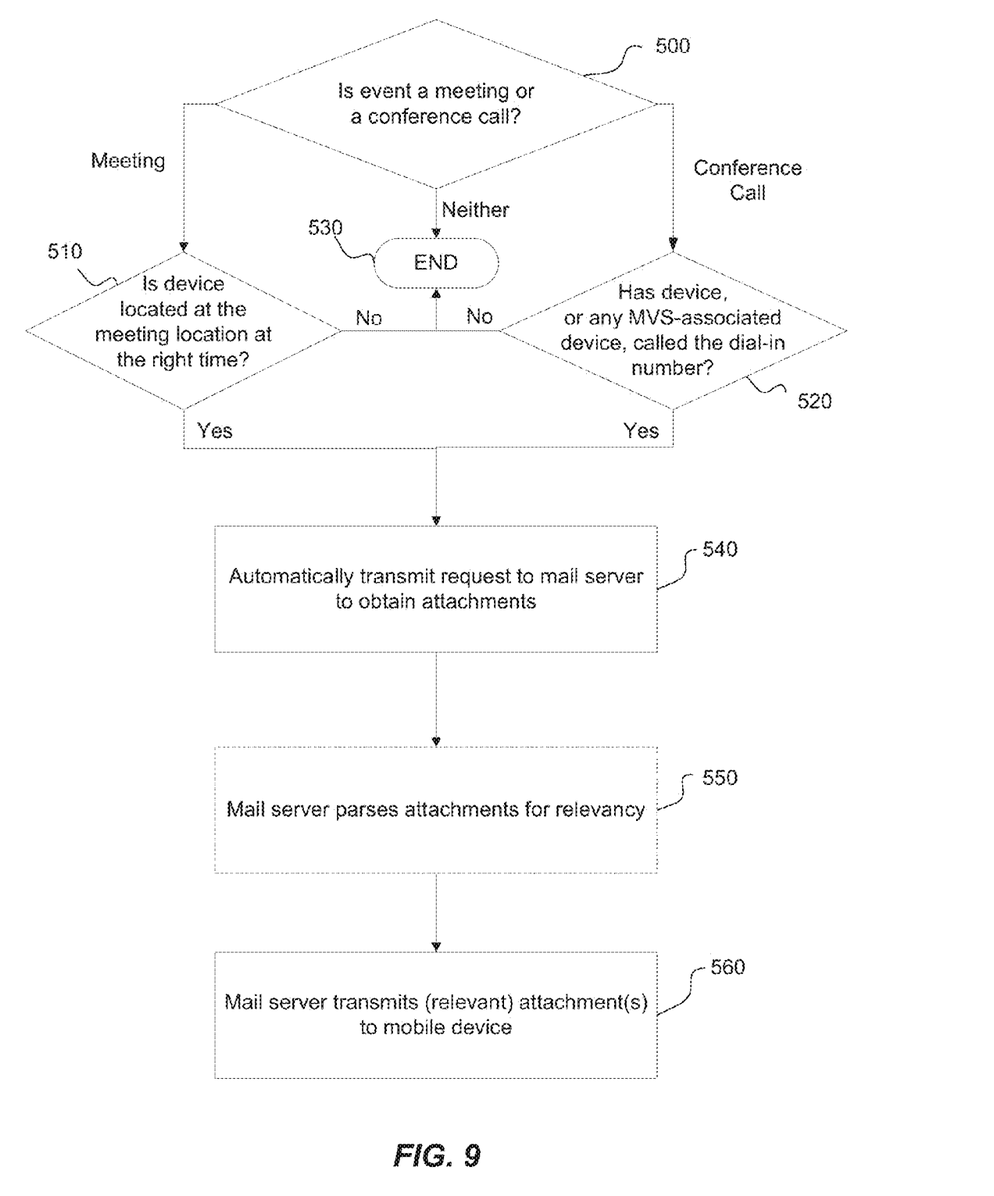
FIG. 9 is a flowchart depicting a specific method of determining whether to download attachments in accordance with another implementation of the present technology.

FIG. 9 depicts a flowchart of a method for determining whether to automatically download an attachment to a message such as a new meeting request. Once the new meeting request has been accepted and entered into the calendar as a calendared event, the device determines (500) if the event is an in-person meeting or a conference call or neither. If the event is a meeting, the device determines (510) if the current location of the device matches the meeting location at the corresponding time. If the event is a conference call, the device determines (520) if the device, or any MVS-associated device, is calling the dial-in number. If the event is neither a meeting nor a conference call, then operations end (530). Continuing from step 510, if the device determines that the location and time match the event, the attachments for the message (meeting request) are automatically downloaded by the process of steps 540-560. Likewise, continuing from step 520, if the conference dial-in number is called, attachments are downloaded automatically. In steps 540-560, the process of automatically downloading attachments involves automatically transmitting a request to the mail server to obtain attachments (540). The mail server may optionally parse the attachments for relevancy (550). The mail server responds by sending the attachments (560). If the optional step of checking their relevancy is performed, then the mail server responds by only sending the relevant attachments at step 560.

The foregoing methods therefore enable the device to intelligently and automatically download from a mail server any attachments that are not yet downloaded and which are attached to a message such as a new meeting request, invitation, or e-mail. The device only downloads the attachments when they are needed by determining or inferring if the user is attending or will be attending the event to which the attachments relate.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of downloading data to a mobile device, the method comprising:
   receiving a message at the mobile device, the message including an indication that there is an attachment to the message that is available for downloading to the mobile device;
   determining if the attachment relates to a calendar event;
   determining if a user of the mobile device requires the attachment for participating in the calendar event; and
   automatically downloading the attachment to the mobile device in response to the mobile device determining that the attachment is required for participation in the calendar event;
   wherein determining if the user of the mobile device requires the attachment comprises:
   determining if the calendar event is a conference call;
   retrieving a list of telephone numbers dialed by the mobile device or by a landline telephone associated with the mobile device; and
   determining if a number stored in association with the calendar event is found in the list of telephone numbers; and
   automatically downloading the attachment to the mobile device on determining a discussion or telephone call will occur relating to the attachment, even though no calendar event is created.

2. The method as claimed in claim 1 wherein determining if the user of the mobile device requires the attachment comprises determining if the mobile device is proximal to a location of the calendar event whereby the attachment is automatically downloaded if the mobile device is proximal to the location of the calendar event at a time corresponding to the calendar event.

3. The method as claimed in claim 2 further comprising deleting the attachment from a memory of the mobile device in response to determining that a scheduled time of the calendar event has elapsed or that the mobile device has strayed a predetermined minimum distance from the location of the calendar event.

4. The method as claimed in claim 3 wherein deleting the attachment comprises:
   presenting a user prompt to request user confirmation that the attachment is to be deleted; and
   receiving user input to confirm that the attachment is to be deleted.

5. The method as claimed in claim 2 wherein determining if the mobile device is proximal to the location of the calendar event comprises determining a current position of the mobile device using a position-determining subsystem on the mobile device.

6. A non-transitory computer-readable medium comprising instructions in code which when loaded into a memory and executed by a processor of a mobile device cause the mobile device to:
- receive a message at the mobile device, the message including an indication that there is an attachment to the message that is available for downloading to the mobile device;
- determine if the attachment relates to a calendar event;
- determine if a user of the mobile device requires the attachment for participating in the calendar event; and
- automatically download the attachment to the mobile device in response to the mobile device determining that the attachment is required for participation in the calendar event;
- wherein the code to determine if the user requires the attachment comprises:
- determining if the calendar event is a conference call;
- retrieving a list of telephone numbers dialed by the mobile device or by a landline telephone associated with the mobile device; and
- determining if a number stored in association with the calendar event is found in the list of telephone numbers; and
- automatically downloading the attachment to the mobile device on determining a discussion or telephone call will occur relating to the attachment, even though no calendar event is created.

7. The computer-readable medium as claimed in claim 6 wherein the code that causes the mobile device to determine if the user of the mobile device requires the attachment comprises code that causes the mobile device to determine if the mobile device is proximal to a location of the calendar event whereby the attachment is automatically downloaded if the mobile device is proximal to the location of the calendar event at a time corresponding to the calendar event.

8. The computer-readable medium as claimed in claim 7 further comprising code that causes the mobile device to delete the attachment from a memory of the mobile device in response to determining that a scheduled time of the calendar event has elapsed or that the mobile device has strayed a predetermined minimum distance from the location of the calendar event.

9. The computer-readable medium as claimed in claim 8 wherein the code that causes the mobile device to delete the attachment comprises code for:
- presenting a user prompt to request user confirmation that the attachment is to be deleted; and
- receiving user input to confirm that the attachment is to be deleted.

10. The computer-readable medium as claimed in claim 7 comprising code that causes the mobile device to determine if the mobile device is proximal to the location of the calendar event by determining a current position of the mobile device using a position-determining subsystem on the mobile device.

11. A mobile device comprising:
- a radiofrequency transceiver for receiving a message at the mobile device;
- a display for displaying the message including an indication that there is an attachment to the message that is available for downloading to the mobile device; and
- a memory operatively coupled to a processor for determining if the attachment relates to a calendar event, determining if a user of the mobile device requires the attachment for participating in the calendar event, and for instructing the radiofrequency transceiver to automatically download the attachment to the mobile device in response to the mobile device determining that the attachment is required for participation in the calendar event;
- wherein the processor determines if the user requires the attachment by:
- determining if the calendar event is a conference call;
- retrieving a list of telephone numbers dialed by the mobile device or by a landline telephone associated with the mobile device; and
- determining if a number stored in association with the calendar event is found in the list of telephone numbers; and
- automatically downloading the attachment to the mobile device on determining a discussion or telephone call will occur relating to the attachment, even though no calendar event is created.

12. The mobile device as claimed in claim 11 comprising a position-determining subsystem for determining a current location of the mobile device and wherein the processor is configured to determine if the current location of the mobile device is within a predetermined distance of a location of the calendar event so as to automatically download the attachment if the mobile device is within the predetermined distance of the location of the calendar event at a time corresponding to the calendar event.

13. The mobile device as claimed in claim 12 wherein the processor is configured to delete the attachment from a memory of the mobile device in response to determining that a scheduled time of the calendar event has elapsed or that the mobile device has strayed beyond the predetermined distance from the location of the calendar event.

14. The mobile device as claimed in claim 13 wherein the processor cause the mobile device to:
- present, on a user interface, a user prompt to request user confirmation that the attachment is to be deleted; and
- receive user input, via the user interface, to confirm that the attachment is to be deleted.

15. The mobile device as claimed in claim 12 comprising a short-range wireless transceiver that is configured to determine if the mobile device is located at the calendar event, thereby causing the attachment to be downloaded.

16. The mobile device as claimed in claim 11 comprising a mobile voice system (MVS) client stored in the memory of the mobile device and executed by the processor of the mobile device to detect a number dialed by the landline telephone.

17. The mobile device as claimed in claim 11 wherein the display presents a graphical notification that the attachment is being automatically downloaded.

* * * * *